United States Patent
Babin

(10) Patent No.: US 6,714,003 B2
(45) Date of Patent: Mar. 30, 2004

(54) FREQUENCY COMPENSATION FOR ROTATING TARGET SENSOR

(75) Inventor: Brian George Babin, Goshen, IN (US)

(73) Assignee: American Electronic Components, Inc., Elkhart, IN (US)

(*) Notice: Subject to any disclaimer, the term of this patent is extended or adjusted under 35 U.S.C. 154(b) by 0 days.

(21) Appl. No.: 10/057,374

(22) Filed: Jan. 25, 2002

(65) Prior Publication Data

US 2003/0141864 A1 Jul. 31, 2003

(51) Int. Cl.[7] .................. G01B 7/14; G01R 33/025; G01R 33/07; H01L 43/06
(52) U.S. Cl. .................. 324/207.12; 324/207.2; 324/207.25; 324/166; 324/174
(58) Field of Search .................. 324/207.12, 207.2, 324/207.25, 166, 174; 338/32 H, 32 R

(56) References Cited

U.S. PATENT DOCUMENTS

| | | | |
|---|---|---|---|
| 4,034,276 A | | 7/1977 | Hyatt |
| 4,293,814 A | * | 10/1981 | Boyer .................. 324/166 |
| 4,481,469 A | * | 11/1984 | Hauler et al. .................. 324/174 |
| 4,556,885 A | | 12/1985 | Kurosawa |
| 4,893,502 A | | 1/1990 | Kubota et al. |
| 4,992,731 A | * | 2/1991 | Lorenzen .................. 324/174 |
| 5,245,262 A | | 9/1993 | Moody et al. |
| 5,278,478 A | | 1/1994 | Moody et al. |
| 5,332,956 A | | 7/1994 | Oh |
| 5,712,560 A | | 1/1998 | Maeda et al. |
| 5,736,852 A | | 4/1998 | Pattantyus |
| 6,198,275 B1 | | 3/2001 | Wolf et al. |
| 6,225,770 B1 | | 5/2001 | Heinrich et al. |
| 6,314,802 B1 | * | 11/2001 | Wu et al. .................. 73/117.3 |

FOREIGN PATENT DOCUMENTS

JP        10003669        1/1998

* cited by examiner

*Primary Examiner*—N. Le
*Assistant Examiner*—Reena Aurora
(74) *Attorney, Agent, or Firm*—Katten Muchin Zavis Rosenman; John S. Paniaguas

(57) ABSTRACT

A compensation circuit for compensating for switching point errors in rotating target or gear tooth sensors. The compensation circuit may include a processing unit and a persistent storage device, such as an electrically erasable programmable read-only memory (EEPROM), for storing compensation values that are used to provide automatic compensation of the rotating target sensor after the sensor module is installed by the end user. The actual and compensation values may be determined and stored as linear functions in the form of mX+b, where X is the frequency of the rotating target, m is the slope and b is the y-intercept. In order to provide compensation, the actual slope value m is multiplied by a compensation value. The y intercept (i.e. b) is selected, for example, to be the maximum speed in a given application. The compensation values (i.e. slope m and intercept b) may be determined on a part-by-part basis by the sensor manufacturer or by utilizing averages, in which case, the calibration values can be determined for the application and pre-programmed by the Hall effect IC manufacturer. In operation, the sensor output value is applied to the compensation circuit which processes the actual operate point and provides ideal operate points automatically, thus eliminating the need for the end user to attempt compensate for switching point errors of such digital Hall effect devices.

14 Claims, 4 Drawing Sheets

FREQUENCY COMPENSATION FOR ROTATING TARGET SENSOR

BACKGROUND OF THE INVENTION

1. Field of the Invention

The present invention relates to a frequency compensation circuit for a sensor used to sense rotating targets, commonly referred to as a gear tooth sensor, which compensates for errors in the operate point of the sensor as a function of the rotational speed of a rotating target.

2. Description of the Prior Art

Rotary position sensors are known to be used in various applications for sensing the angular position of various mechanical devices in various mechanical applications. For example, commonly-owned U.S. Pat. Nos. 4,893,502 and 5,332,956 disclose a rotary position sensor for use in automotive applications for detecting angular movement of a butterfly valve in a throttle body. The rotary position sensor includes a magnetic flux responsive element, such as an analog linear Hall effect device, a magnet, one or more flux concentrators and a shunt ring. The magnet and shunt ring are mounted to rotate with the butterfly valve, while the magnetic flux responsive element and flux concentrators are mounted at a fixed air gap relative to the magnet. With such a configuration, rotation of the butterfly valve causes rotation of the magnet, which, in turn, causes a change in magnetic flux with respect to the magnetic flux responsive element, resulting in a linear voltage being generated that is proportional to the change in magnetic flux and thus proportional to the angular position of the butterfly valve.

Due to the manufacturing tolerances of the components used in such rotary position sensors, such sensors are subject to part-to-part variations. More specifically, the output values of different sensors in response to identical input signals are known to differ due to the manufacturing tolerances of the components used to make the rotary position sensor. In order to compensate for such part-to-part variations, compensation circuits are known. For example, commonly-owned U.S. Pat. No. 6,198,275 discloses a compensation circuit for compensating the sensitivity and offset variations of such sensors. In particular, the compensation circuit disclosed in the '275 patent includes a processing unit, a test interface and a persistent storage device, such as electrically erasable programmable read-only memory (EEPROM).

Output signals from the rotary position sensor are applied to the processing unit by way of an analog-to-digital converter. The processing unit compares the actual output values with ideal values in order to compensate for the part-to-part variations. The ideal output values for the rotary position sensor are determined at various angular positions of the magnet, relative to the magnetic flux responsive element, to emulate various angular positions of a butterfly valve in a throttle body. The ideal output value at each angular position is detected and stored. The deviations between the actual values and the ideal values are used to determine compensation values for the sensor under test. The compensation values are loaded into the EEPROM and included as part of a sensor module. As such, when the sensor module is installed in, for example, a throttle body, the module provides for automatic compensation of the part-to-part variations. As such, the end user, an automobile manufacturer, need only install the sensor module and need not engage in the time consuming and cumbersome adjustments of such sensors after installation into an automobile.

The compensation circuit disclosed in the '275 patent provides satisfactory results for rotary position sensors which include linear Hall effect devices for compensating for offset and sensitivity errors of such linear Hall effect devices, for example, over an operating range of less than 360°. However, such a compensation circuit cannot be used to compensate for other types of errors in other applications. For example, sensors are also used in rotating target applications for sensing when a rotating mechanical member, such as a cam shaft or a crank shaft, crosses a reference point. Such sensors are known as gear tooth sensors or rotating target sensors. In such an application, digital Hall effect devices are known to be used and switch from one logic state to another logic state as a function of the position of the rotating gear teeth or targets relative to a reference point. Unfortunately, errors are known to occur with respect to the switching point of the digital Hall effect device as a function of the RPM of the rotating targets. No systems are known for compensating for such switching point errors as a function of RPM. As such, such sensors are manufactured and shipped to the end user, for example, an automobile manufacturer, which must attempt to compensate for such errors. Thus, there is a need for a compensation circuit for such gear tooth sensors, used in rotating target applications, which provides compensation for the switching point as a function of the RPM of the rotating target.

SUMMARY OF THE INVENTION

Briefly, the present invention relates to a compensation circuit for compensating for switching point errors in rotating target or gear tooth sensors. The compensation circuit may include a processing unit and a persistent storage device, such as an electrically erasable programmable read-only memory (EEPROM), for storing compensation values that are used to provide automatic compensation of the rotating target sensor after the sensor module is installed by the end user. The actual and compensation values may be determined and stored as linear functions in the form of mX+b, where X is the frequency of the rotating target, m is the slope and b is the y-intercept. In order to provide compensation, the actual slope value m is multiplied by a compensation value. The y intercept (i.e. b) is selected, for example, to be the maximum speed in a given application. The compensation values (i.e. slope m and intercept b) may be determined on a part-by-part basis by the sensor manufacturer or by utilizing averages, in which case, the calibration values can be determined for the application and pre-programmed by the Hall effect IC manufacturer In operation, the sensor output value is applied to the compensation circuit which processes the actual operate point and provides ideal operate points automatically, thus eliminating the need for the end user to attempt compensate for switching point errors of such gear tooth or rotating target sensors, such as digital Hall effect devices.

DESCRIPTION OF THE DRAWINGS

These and other advantages of the present invention will be readily understood with reference to the following specification and attached drawing wherein.

DETAILED DESCRIPTION

The present invention relates to a compensation circuit and method for compensating switching point errors in gear tooth or rotating target sensors. The principles of the present invention are applicable to all types of gear tooth or rotating target sensors; both forward biased and back biased sensors.

Figure 1A:
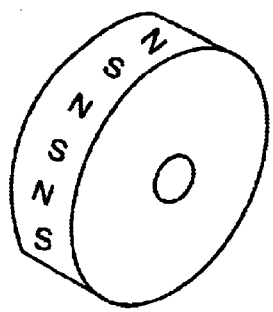
FIGS. 1A and 1B are perspective views of alternate magnetic encoders (rotors) for gear tooth sensors for use with the present invention.
Figure 1B:
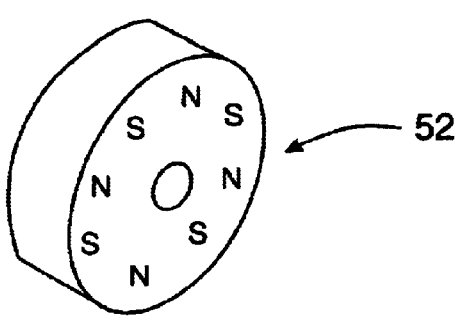

Forward biased sensors include a magnetic responsive element, such as a digital Hall effect device, and a multiple pole magnetic rotor, such as a radially magnetized rotor 50, as illustrated in FIG. 1A, or an axially magnetized rotor 52, as illustrated in FIG. 1B. In such an application, the magnetic rotor 50, 52 is configured to rotate with the mechanical device whose position is to be sensed, for example, a cam shaft or a crank shaft. A magnetic flux responsive element, such as a digital Hall effect device, is mounted at a fixed air gap relative to the magnetic rotor 50, 52. Accordingly, rotation of the magnetic rotor 50, 52, causes changes in the magnetic flux, which, in turn, causes the digital Hall effect device to change logic states to provide an indication of the angular position of the magnetic rotor 50, 52 and thus the mechanical device.

Figure 2:
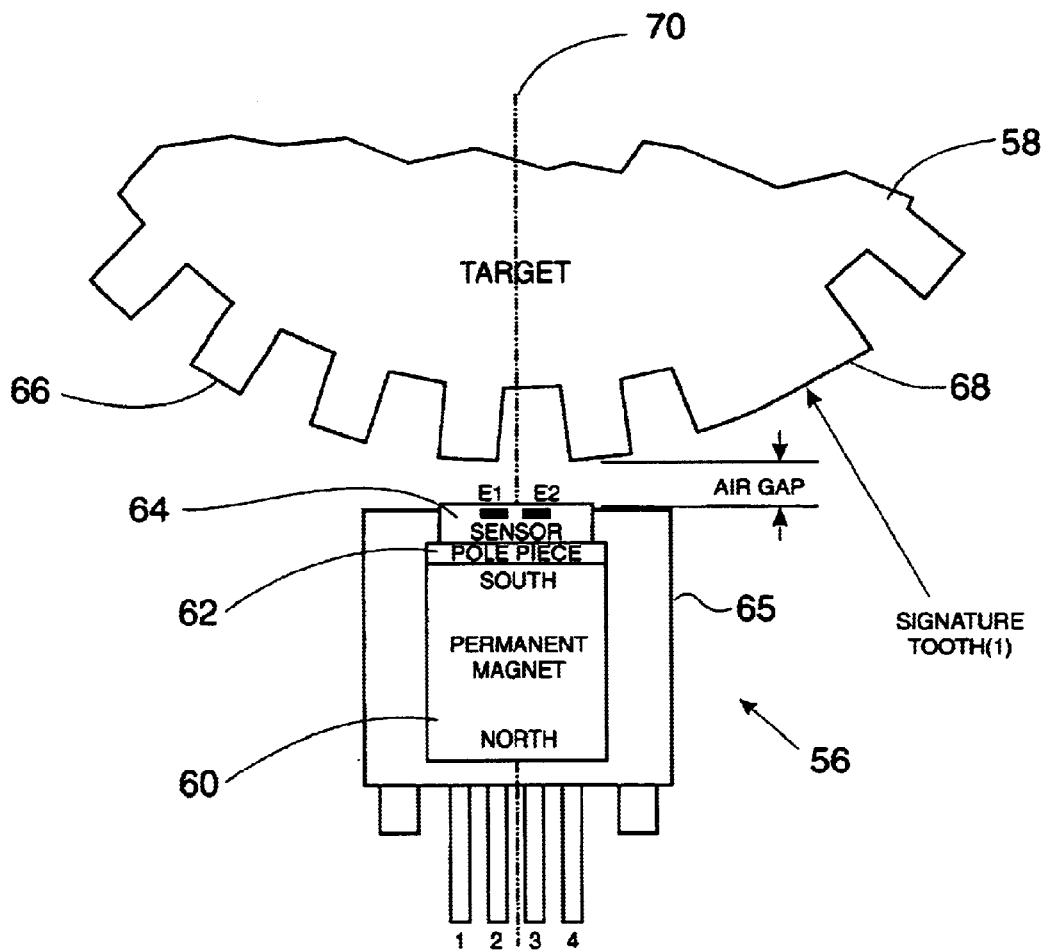
FIG. 2 is an elevational view of a sensor module for use with the present invention.

An exemplary back biased gear tooth sensor is illustrated in FIG. 2 and generally identified with the reference numeral 56. The back biased gear tooth sensor 56 is configured to sense the angular rotation of a ferrous target wheel 58. The sensor 56 includes a magnet 60, an optional pole piece 62 and digital Hall effect IC 64, which includes a pair of side-by-side Hall effect elements, identified as E1 and E2. The magnet 60, pole piece 62 and digital Hall effect IC 64 are packaged in a module 65, which may also include a memory storage device and other electronic circuitry, such as an Allegro Model No. ATS6XX sensor. The module 65 is mounted at a fixed air gap from the ferrous target wheel 58, which may be formed with one or more target gear teeth 66 and one or more reference gear teeth 68. In operation, as the leading edge of a target gear tooth 66 or a reference gear tooth 68 travels past a reference plane 70, perpendicular to an axis of rotation of the ferrous target wheel 58 and perpendicular to a sensing plane of the digital Hall effect IC 64, the digital Hall effect IC changes logic states, to indicate the angular position of the target gear tooth 66 or reference gear tooth 68 and thus the angular position of the mechanical device whose angular position is being sensed.

As mentioned above, errors in the switching point of the Hall effect IC 64 are known to occur as a function of the angular speed or RPM of the ferrous target wheel 58. In order to compensate for these errors, the system in accordance with the present invention measures the actual switching point of the sensor and compares them with ideal switching points to generate compensation factors in order to automatically compensate and provide ideal output values under a relatively wide range of operating speeds of the rotating gear tooth wheel 58.

In accordance with an important aspect of the invention, the sensor 56 may be packaged in a module which includes a processing unit 70 (FIG. 3), such as a microprocessor, and a persistent storage device 72, such as an electrically erasable programmable read-only memory (EEPROM) forming the module 65. As will be discussed in more detail below, compensation values are be loaded into the memory 72 by way of a test interface 76.

Due to the part-to-part differences in the switching point of known sensors 56, the actual switching point of each sensor 56 may be measured on a part-by-part basis and compared with ideal values in order to generate compensation factors which are loaded into the memory 72. Alternatively, average compensation values may be used, for example, and pre-programmed by the IC manufacturer. Once these compensation factors are loaded into the memory 72, the end user need only install the module 65.

Figure 3:
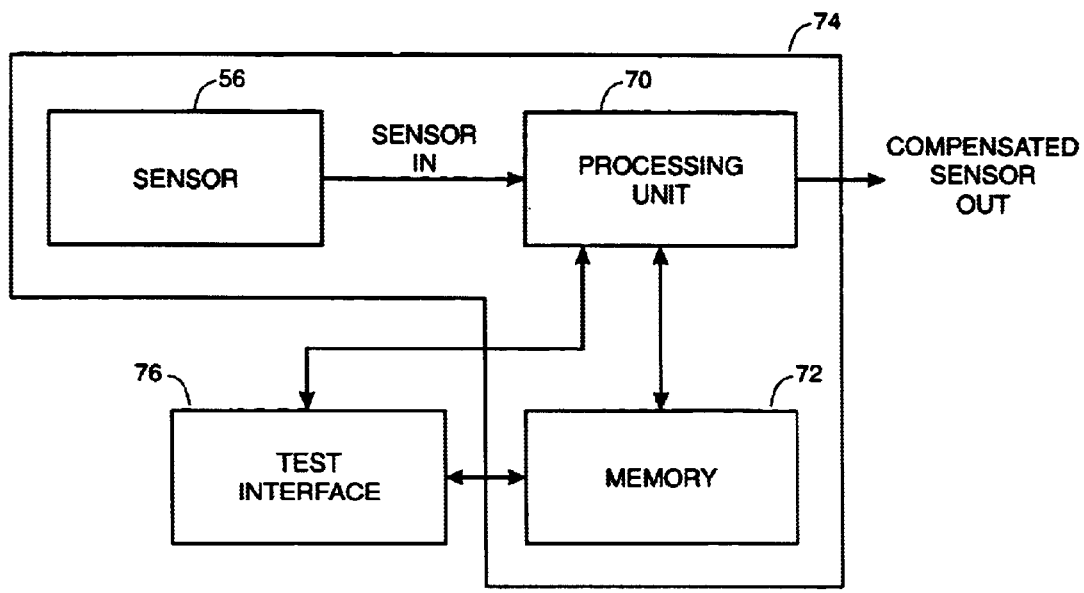
FIG. 3 is a block diagram of a compensation circuit in accordance with the present invention for a rotating target sensor, shown connected to a test interface.
Figure 5:
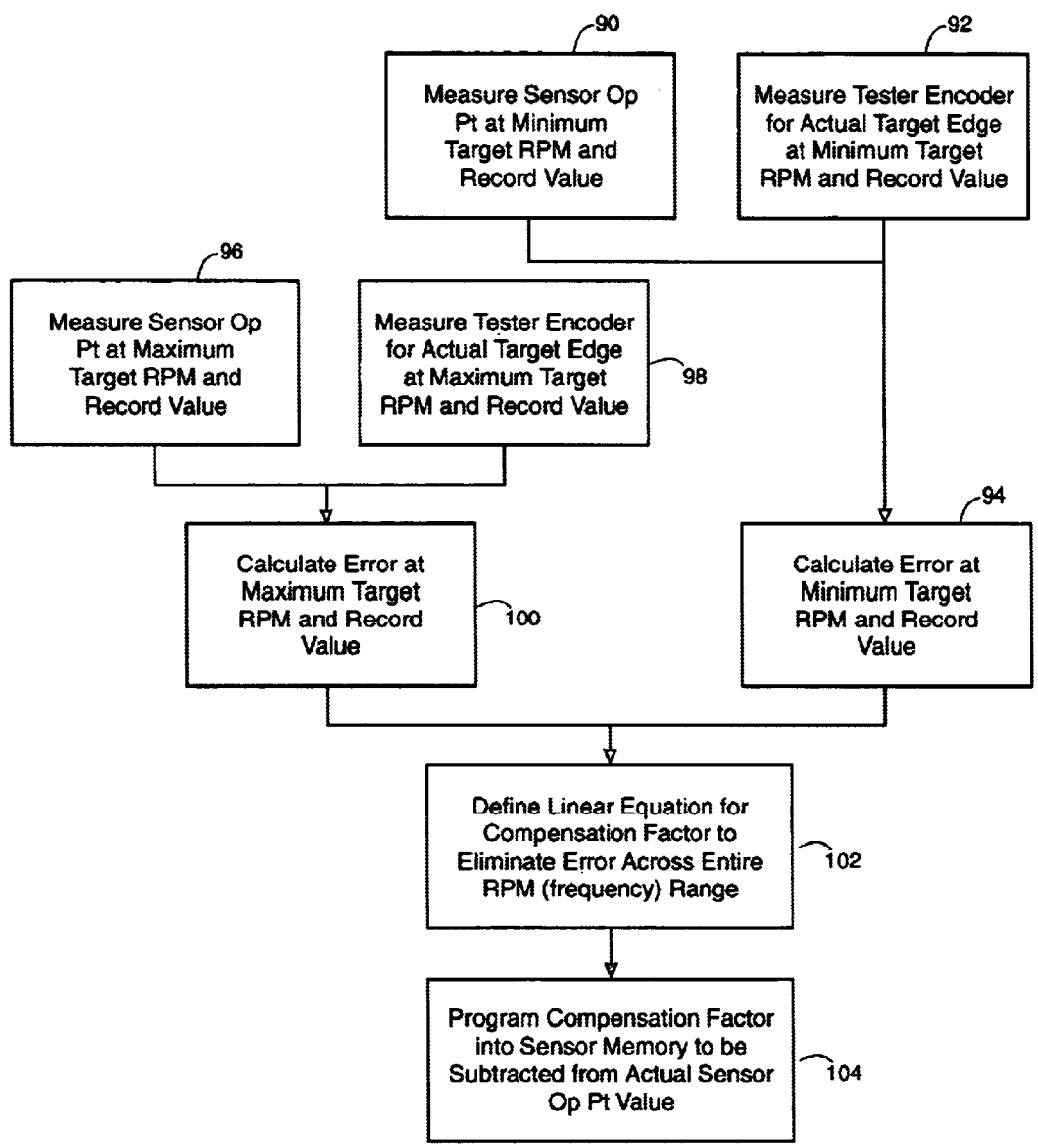
FIG. 5 is a block diagram of the calibration process of the frequency compensation system in accordance with the present invention.

The process for determining the compensation factors is illustrated in FIG. 5. The calibration process may be conducted by way of the test interface 76 (FIG. 3). The test interface 76 may include a fixture (not shown) for rotatably mounting the ferrous target wheel 58, an optical encoder, for example, as manufactured by BEI Technologies, Inc. (http://www.bei-tech.com) and the sensor 56 and a device for rotating the ferrous target wheel or magnetic encoder.

Figure 4:
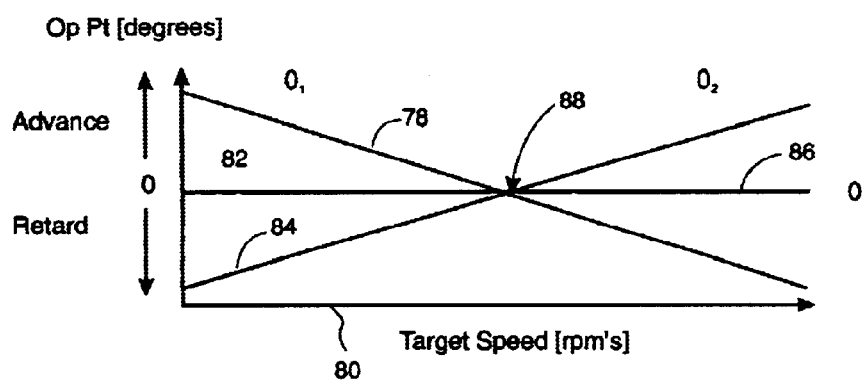
FIG. 4 is a graphical illustration of the actual operation point ($\theta_1$), compensation factor ($\theta_2$) and the compensated operate point ($\theta$) as a function of RPM for a rotating target sensor.

Errors in the actual operate points as a function of the RPM of the ferrous target wheel 58 are illustrated in FIG. 4. As shown in FIG. 4, the actual operate points either leads or lags the ideal operate points (i.e. leading edge of a target gear tooth 66), as identified by the point 82. As shown, the errors in the actual switching points vary linearly as a linear function of the speed of the rotating target wheel 56. The actual error function 01 is provided by the equation (1) below:

$$\theta_1 = m_1 X + b_1, \text{ where } m_1 \text{ is the slope and } b_1 \text{ is the intercept.} \quad (1)$$

In order to compensate for the error in the switching point, a linear compensation function, $\theta_2$, identified by the line 84, is determined by way of the test interface 76. As shown, the compensation function $\theta_2$ also is a linear function but with a complementary slope, relative to the actual switching point function $\theta_1$. The intercept $b_2$ is selected so that an ideal switching point is generated, for example, at the maximum operating RPM of the device. The compensation function $\theta_2$ is given by equation (2) below.

$$\theta_2 = m_2 X + b_2, \text{ where } m_2 \text{ is the slope, selected to be complementary to the slope } m_1, \text{ and } b_2 \text{ is the intercept.} \quad (2)$$

The actual operate points as well as the compensation factors may be stored as functions, $\theta_1$ and $\theta_2$, respectively. By measuring the RPM of the rotating target sensor, the switching point error can be easily determined for that RPM. In accordance with the present invention, the compensation factor is also determined for that RPM and is subtracted from the actual switching point to provide an ideal output value as indicated in equation (3) below.

$$\theta = \theta_1 - \theta_2 \quad (3)$$

By subtracting the compensation value from the actual switching point, the output of the module 65 (FIG. 3) provides an ideal switching point, identified by the line 86 (FIG. 4), over a relatively wide range of speeds of the ferrous target wheel 58 or magnetic encoder.

In known applications, the range of application speeds of a rotating mechanical device, such as a cam shaft or a crankshaft is known. As discussed above, since the angular position errors are a linear function, the actual sensor operating point as well as the ideal sensory operating point at the minimum and maximum RPMs can be determined to define the linear function. More particularly, with reference to FIG. 5, this actual sensor operating point at the minimum RPM is measured and recorded, as indicated by the box 90. Similarly, the ideal operate point, as measured by the optical encoder in the test interface 76 at the minimum RPM is also measured as indicated by the box 92. In particular, the ideal reference points are determined by measuring when a leading edge of a target gear tooth 66 (FIG. 2) crosses with the reference plane 70. The actual and ideal operate point for the minimum RPM is compared in order to calculate the error at the minimum RPM, as indicated by the box 94.

Similarly, the actual sensor operating point for the maximum expected RPM is measured and recorded, as indicated by the box 96. The ideal actuate point corresponding to the leading edge of the target gear tooth 66 is also measured and recorded, as indicated by the box 98. The actual and ideal operate point are compared in order to determine the error at the maximum RPM, as indicated by the box 100.

As indicated above, the compensation function $\theta_2$ is a linear function amenable to being defined by two points. The errors determined in step 94 and 100 are used to define the two points to define the compensation function $\theta_2$ for the entire RPM range, as indicated in step 102. More specifically, since two points in the compensation function are known, the slope m of the compensation factor as well as the y intercept-b are easily determined and programmed into the persistent memory 72 (FIG. 4) as indicated in step 104. The compensated values can then easily be determined as a linear function of the RPM and then subtracted from the actual values to provide ideal compensated sensor output value as discussed below.

Figure 6:
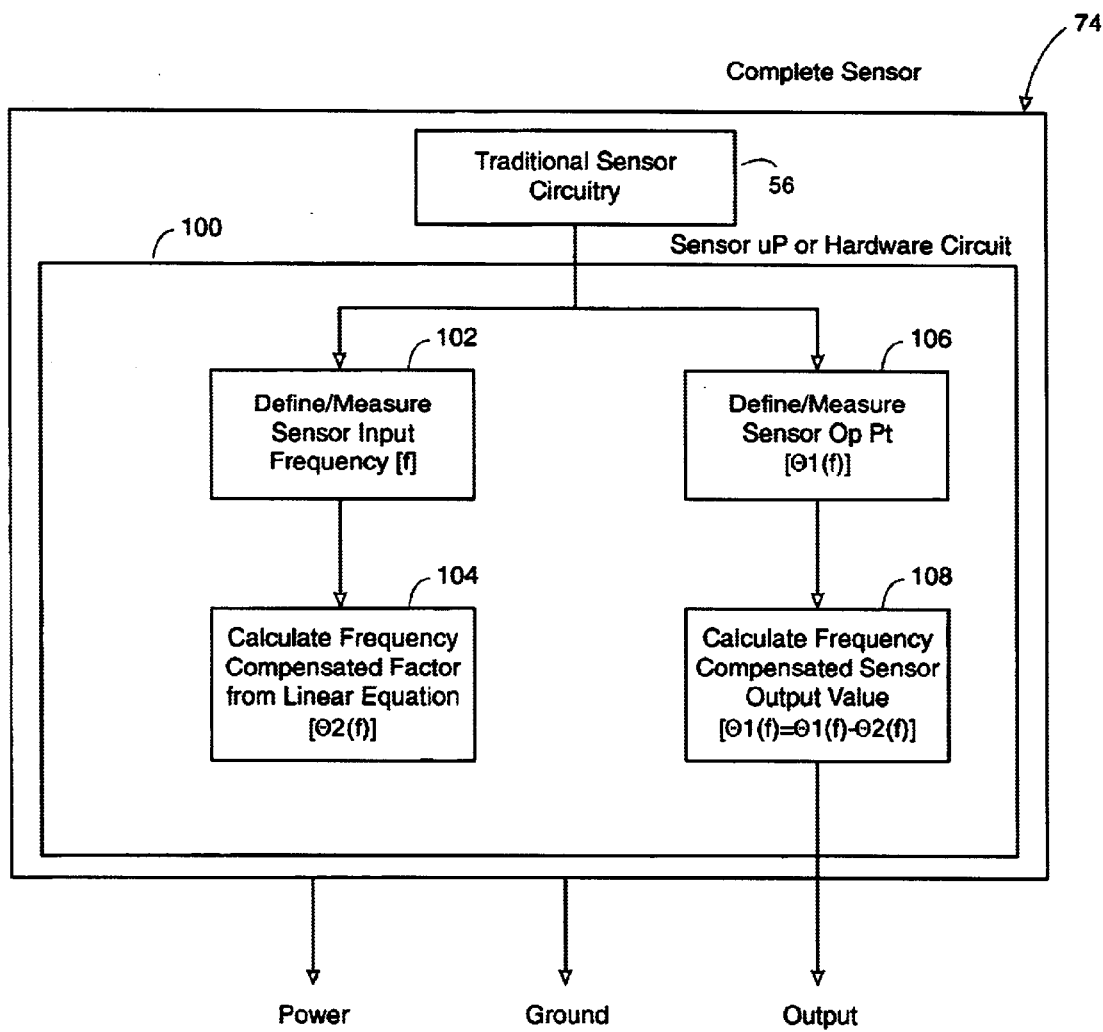
FIG. 6 is a block diagram of the compensation system in accordance with the present invention.

The operation of the module 65 is illustrated in FIG. 6. As shown, the sensor module 65 includes a rotating target sensor 56, for example, as illustrated and described in FIG. 2 and includes compensation hardware 100, for example, a processing unit 70 and memory 72, as illustrated in FIG. 4 or alternatively other hardware not including a microprocessor.

In operation, the sensor-input frequency is measured as indicated in step 102. The sensor-input frequency can be measured by counting the pulses of the sensor-input signal, for example, by way of the microprocessor or a conventional counting device. The compensation factor for the measured RPM is determined in step 104 from equation (2). Similarly, the actual sensor switching point error is determined in step 106 from equation (1). In step 108, the compensated sensor output signal is determined. The compensation value is determined from the equation (3) by subtracting the compensation value from the actual value $\theta_1$ to provide a compensated sensor output signal.

The process discussed above is determined during a portion of a revolution of the ferrous target wheel 58, defined herein as a calibration period. Thus, after the processing mentioned above, corrected switching points are generated by the processing unit 70 and the compensation circuit is synchronized with a reference gear tooth 68 or a target tooth 68. More particularly, since the size and number of gear teeth 66 and the reference gear teeth 68 of the ferrous target wheel 58 are known, the angular distance therebetween is also known. Thus, once the RPM is determined, the pulses generated by the processing unit 70 are synchronized with the target gear teeth 66 and a reference gear teeth 68 during the calibration period. More particularly, since the distance between gear teeth 66 and 68 as known, as well as the RPM, the frequency of the output pulse train can easily be determined. In order to synchronize the output pulse train with the gear teeth 66 and 68 on the ferrous target wheel 58, the phase of the pulses in the output pulse train is shifted as a function of the error $\theta_2$ (i.e. either advanced or retarded)

As the RPM of the shaft varies, the system re-samples the RPM recalculates the compensation factors and generates ideal switching pulses, which correspond to the leading edge of the target gear teeth 66 for that RPM. As such, steps 102–108 are repeated. The system constantly monitors the input frequency of the sensor input signal and generates compensated output pulses which correspond to the leading edge of the gear tooth Obviously, many modifications and variations of the present invention are possible in light of the above teachings. For example, the principles of the present invention can be easily applied to compensate for the release point of a Hall effect IC. Thus, it is to be understood that, within the scope of the appended claims, the invention may be practiced otherwise than as specifically described above.

What is claimed and desired to be covered by a Letters Patent is as follows:

I claim:

1. A process for compensating the operate point of a rotating target sensor over a predetermined range of RPMs the rotating target sensor including a Hall effect integrated circuit and a rotating target, the Hall effect integrated circuit configured to switch logic states as a function of the presence or absence of said rotating target defining an operate signal, the process comprising the steps of:
   (a) sensing the rotational speed of said rotating target; and
   (b) compensating the actual switching point of the Hall effect integrated circuit by monitoring the actual operate signals of said Hall effect integrated circuit; and providing an ideal operate signal as a function of the actual operate signal and the rotational speed of the rotating target.

2. The process as recited in claim 1, wherein step (b) includes the step of using stored compensation values.

3. The process as recited in claim 1, wherein step (b) includes the step of storing said compensation values as a compensation function of said RPM.

4. The process as recited in claim 3, wherein step (b) includes the step of storing said compensation function as a linear function is defined by at least two different RPMs in the form of $\theta_2 = m_2 X + b_2$, wherein $m_2$ is the slope of the compensation function and $b_2$ is the y intercept and X is the RPM.

5. The process as recited in claim 4, wherein step (b) includes the step of determining the values of the compensation function at the maximum and minimum RPMs over said predetermined operating range.

6. The process as recited in claim 5, wherein the intercept $b_2$ is selected so that ideal output pulses are generated at the maximum RPM.

7. The process as recited in claim 5, wherein the actual switching points are stored as a switching point function $\theta_1$.

8. The process as recited in claim 7, wherein step (b) includes the step of storing said switching point function as a linear function defined by at least two points in the form $\theta_1 = m_1 X + b_1$ where X is the RPM, $m_1$ is the slope and $b_1$ is the intercept.

9. The process as recited in claim 8, wherein step (b) includes the step of selecting the slope $m_2$ for the compensation function to be complementary to the slope $m_1$.

10. The process as recited in claim 9, step (b) includes the step of determining the values of the switching function at the maximum and minimum RPMs over said predetermined operating range.

11. The process as recited in claim 9, wherein step (b) includes the step of subtracting the compensation value from the actual value for a given RPM.

12. The process as recited in claim 10, wherein step (b) includes the step of generating output pulses with ideal switching points over said entire operating range.

13. A system for compensating the points at which a digital Hall effect sensor changes logic states in response to the presence or absence of a target defining operate signals, said system adapted to be used in rotating target applications the system including:

a storage device for storing compensation values as a function of the rotational speed of said target;

a monitoring device for monitoring the rotational speed of a rotating target; and a compensation circuit coupled to said storage device for receiving said operate signals from said digital Hall effect device and generating ideal operate signals as a function of said actual operate signals, the rotational speed of said rotating target, and said compensation values.

14. The system as recited in claim 13, wherein said compensation circuit includes a processing unit.

* * * * *